(12) United States Patent
Meggiolan

(10) Patent No.: US 7,481,499 B2
(45) Date of Patent: *Jan. 27, 2009

(54) WHEEL HUB FOR BICYCLE

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/729,001

(22) Filed: Mar. 28, 2007

(65) Prior Publication Data

US 2007/0205655 A1    Sep. 6, 2007

Related U.S. Application Data

(63) Continuation of application No. 10/914,454, filed on Aug. 9, 2004, which is a continuation of application No. 09/951,547, filed on Sep. 14, 2001, now Pat. No. 6,783,192.

(30) Foreign Application Priority Data

Sep. 15, 2000   (IT)   ................ TO2000A0868

(51) Int. Cl.
*B60B 27/00* (2006.01)
*F16D 23/00* (2006.01)
(52) U.S. Cl. ................ 301/110.5; 301/59; 192/64
(58) Field of Classification Search ... 301/110.5–110.6, 301/105.1, 106, 108.1, 108.3, 108.4, 59, 301/109–110; 192/64
See application file for complete search history.

(56) References Cited

U.S. PATENT DOCUMENTS

| 726,103 | A | 4/1903 | Schacht |
|---|---|---|---|
| 4,595,242 | A | 6/1986 | Wehmeyer |
| 4,930,844 | A | 6/1990 | Giroux |
| 5,104,201 | A | 4/1992 | Ross |
| 5,487,592 | A | 1/1996 | Rasmussen |
| 5,494,337 | A | 2/1996 | Behnke |
| 5,499,864 | A | 3/1996 | Klein et al. |
| 5,782,540 | A | 7/1998 | Camfield et al. |
| 5,829,844 | A | 11/1998 | Slankard et al. |
| 5,909,931 | A | 6/1999 | Tabe |
| 5,975,645 | A | 11/1999 | Sargent |
| 5,997,104 | A | 12/1999 | Campagnolo |
| 6,010,197 | A | 1/2000 | Crosnier et al. |
| 6,398,313 | B1 | 6/2002 | Lew |
| 6,409,281 | B1 | 6/2002 | Kanehisa et al. |
| 6,431,658 | B1 | 8/2002 | Nakajima et al. |
| 6,511,133 | B1 | 1/2003 | Tabe |
| 6,783,192 | B2 | 8/2004 | Meggiolan |

FOREIGN PATENT DOCUMENTS

| DE | 3406650 A1 | 9/1985 |
|---|---|---|
| DE | 196 21 121 A1 | 11/1996 |
| EP | 1 231 047 A1 | 8/2002 |
| FR | 2 524 395 | 10/1983 |
| FR | 2 551 001 A1 | 3/1985 |
| FR | 2 739 059 A1 | 3/1997 |
| GB | 573423 | 11/1945 |

*Primary Examiner*—Jason R Bellinger
(74) *Attorney, Agent, or Firm*—Volpe and Koenig, P.C.

(57) ABSTRACT

Wheel hub having a central tubular portion and a pair of side caps, whose diameter is larger than the said central portion is provided. The hub comprises a monolith body made of fiber-reinforced plastic material.

13 Claims, 2 Drawing Sheets

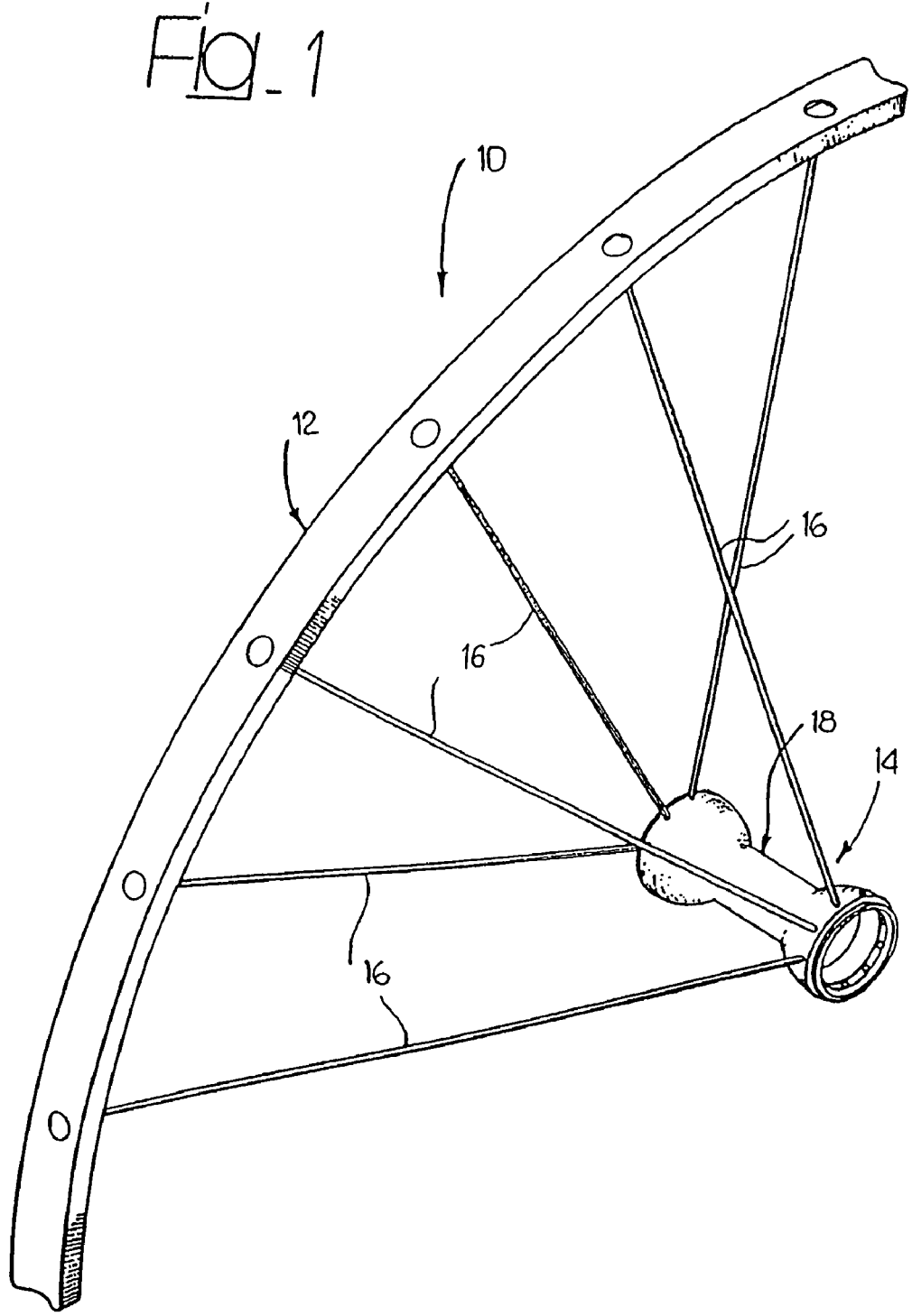

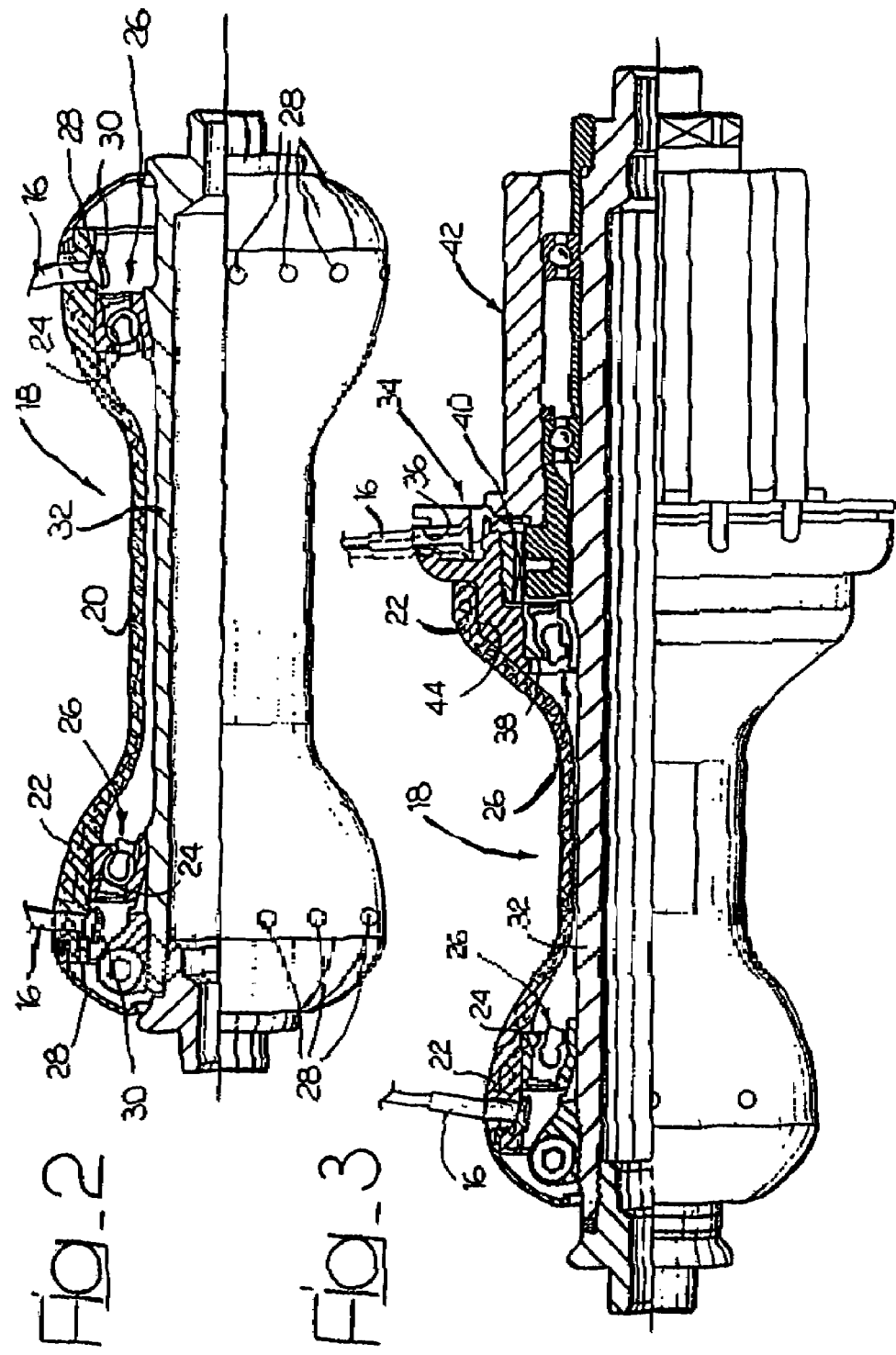

WHEEL HUB FOR BICYCLE

RELATED APPLICATIONS

This application is a continuation of U.S. patent application Ser. No. 10/914,454, filed Aug. 9, 2004, which is a continuation of U.S. patent application Ser. No. 09/951,547, filed Sep. 14, 2001, issued as U.S. Pat. No. 6,783,192, which are incorporated by reference as if fully set forth.

BACKGROUND OF THE INVENTION

This invention relates to a wheel hub for a bicycle, specifically a competition bicycle.

The main objective of the competition bicycle manufacturers is to reduce the weight of the single components as much as possible. In the case of wheel hubs, conventional technology involves the use of metallic light alloys, such as aluminium alloys and similar. Various solutions have been proposed to reduce the weight of the wheel hub in which the central tubular part of the wheel hub is made of carbon fiber incorporated in a plastic material resin and in which a pair of side caps made of aluminium alloy are fastened to the ends of the carbon fiber central portion. The inside caps are provided with housings for supporting rolling bearings and holes for anchoring the wheel spokes.

The objective of this invention is to provide a wheel hub which is lighter and presents better characteristics in terms of rigidity with respect to the known solutions mentioned above.

SUMMARY OF THE INVENTION

This objective is attained by a wheel hub comprising a central tubular portion and a pair of side caps, which diameter is larger than said central portion, characterized in that said hub comprises a monolith body made of fiber-reinforced plastic material including said central portion and said side caps.

As will be better explained in the following part of this description, the hub according to this invention is lighter and more rigid than the known solutions. The greater rigidity in correspondence to the rolling bearing housings formed inside the side caps reduces the radial play on the bearings and facilitates wheel assembly and centering operations, especially in the case in which the wheel rim is made of fiber-reinforced plastic material, specifically carbon fiber.

BRIEF DESCRIPTION OF THE DRAWINGS

This invention will be better explained by the following detailed descriptions with reference to the accompanying figure as non-limiting example, whereas:

FIG. 1 is a perspective partial view of a bicycle wheel with a hub according to this invention, FIG. 2 is a partially sections elevated front view of a front wheel hub according to this invention, and FIG. 3 is a partially sectioned elevated front view of a rear wheel hub according to this invention.

DETAILED DESCRIPTION OF THE DRAWINGS

In FIG. 1, numeral 10 indicates a bicycle wheel comprising a rim 12 and a hub 14 connected to the rim 12 by means of a plurality of spokes 16.

The hub according to this invention comprises a monolith body 18 consisting of fiber-reinforced plastic material. Preferably, the plastic material is a thermosetting resin and the reinforcement fibers are carbon fibers. The body 18 comprises a tubular central portion 20 and a pair of side caps 22 formed integrally with the central portion 20 with a larger diameter than said central portion.

FIG. 2 shows a first form of embodiment of a hub according to this invention, destined to be used on a front wheel. In this first form of embodiment, each of the caps 22 is provided with a ground housing 24, in which the external race of a roller bearing 26 is arranged. Each cap 22 is provided with a set of holes 28, which are used to anchor the head portions 30 of the respective spokes 16.

In a conventional manner, the roller bearings 26 support the rotation of the body 18 around a pin 32.

FIG. 3 illustrates a second form of embodiment of the hub according to this invention. The parts corresponding to those described above are indicated with the same numerals. The hub shown in FIG. 3 is destined to be fitted on a rear wheel. One of the side caps 22 (the one on the right in the figure) is shaped to receive a chainring 34 of a freewheel device. The chainring 34 can be made of light metal alloy, for example aluminium alloy or a similar alloy. The chainring 34 is provided with holes 36 for anchoring the spokes 16 and presents a ground housing 38 for the external race of a roller bearing 26. The chainring 34 is connected to a freewheel device 40 in the known way. The free wheel device is connected to a grooved hub 42 on which the rear pinions of the shifting system are connected (not shown). The chainring 34 is fastened with interference in a housing 44 formed inside the respective cap 22. The other cap 22 (the one on the left in FIG. 3) is made identically as described above in relation to the hub for the front wheel.

The caps 22 made of carbon fiber confer a considerable rigidity in the radial direction to the hub 18. The radial deformations of the caps 22 induced by the tension of the spokes 16 are practically negligible with respect to those obtained by light alloy caps. This characteristic is particularly advantageous because in the hub according to this invention the tension of the spokes 16 does not produce an increase of play in the roller bearing housing 26.

The use of the hub according to this invention is particularly advantageous when used in combination with a rim also made of carbon fiber-reinforced plastic material. In this case, both the hub and the rim are practically not deformable and the only elastically deformable elements are the spokes 26. This facilitates wheel centering and prevents rim ovalization and undesired increased play on the hub bearings.

Naturally, numerous changes can be implemented to the construction and forms of embodiment of the invention herein envisaged, all comprised within the context of the concept characteristics this invention, as defined by the following claims.

What is claimed is:

1. A bicycle wheel hub comprising:
   a hollow tubular central portion formed about an axial centerline, the tubular central portion having predetermined interior and exterior diameters; and
   radially outwardly tapering first and second end caps having interior and exterior diameters greater than the predetermined interior and exterior diameters of the tubular central portion, each of the first and second end caps defining a bearing seat and a plurality of circumferential spoke receiving apertures positioned axially outward of each bearing seat and radially further from the tubular central portion than each bearing seat;
   wherein the thickness of said end caps is continuously increasing extending axially outward from each bearing seat to the spoke receiving apertures.

2. The wheel hub of claim 1, wherein said tubular central portion comprises a unitary body made of fiber-reinforced plastic material.

3. The wheel hub of claim 2, wherein said plastic material comprises a thermosetting resin.

4. The wheel hub of claim 2, wherein said fiber-reinforced plastic comprises carbon fibers.

5. The wheel hub of claim 1, wherein said tubular central portion has a continuously increasing wall thickness extending axially from said tubular central portion to said spoke receiving apertures.

6. The wheel hub of claim 1, wherein said spoke receiving apertures are located proximate an open end of each of said end caps, said end caps having a continuously-solid periphery.

7. A bicycle wheel hub comprising:
   a hollow tubular central portion formed about an axial centerline, the tubular central portion having predetermined interior and exterior diameters; and
   radially outwardly tapering first and second end caps having interior and exterior diameters greater than the predetermined interior and exterior diameters of the tubular central portion, at least one of the first and second end caps defining a bearing seat and a plurality of circumferential spoke receiving apertures positioned axially outward of each bearing seat and radially further from the tubular central portion than each bearing seat;
   wherein the thickness of at least one of said end caps is continuously increasing extending axially outward from the bearing seat to the spoke receiving apertures.

8. The wheel hub of claim 7, wherein said tubular central portion comprises a unitary body made of fiber-reinforced plastic material.

9. The wheel hub of claim 8, wherein said plastic material comprises a thermosetting resin.

10. The wheel hub of claim 8, wherein said fiber-reinforced plastic comprises carbon fibers.

11. The wheel hub of claim 7, wherein said tubular central portion has a continuously increasing wall thickness extending axially from said tubular central portion to said spoke receiving apertures.

12. The wheel hub of claim 7, wherein said spoke receiving apertures are located proximate an open end of each of said end caps, said end caps having a continuously-solid periphery.

13. A bicycle wheel hub comprising:
   a tubular central portion having a first predetermined thickness and radially outwardly-tapering side caps that have a second predetermined thickness greater than the first predetermined thickness which are integrally formed at each end of the central portion, and define free open ends at their most axially outward point;
   an annular bearing seat in at least one side cap extending axially inwardly from the respective open end; and,
   a plurality of spoke anchoring apertures located axially outwardly of the bearing seat and extending radially outwardly through the at least one side cap,
   wherein the thickness of said side caps is continuously increasing while extending axially outward from each bearing seat to the spoke receiving apertures.

* * * * *